United States Patent
Smith et al.

[11] 3,900,781
[45] Aug. 19, 1975

[54] MOTOR SPEED CONTROL SYSTEM WITH TIMED SPEED REFERENCE CLAMP AND SPEED ERROR SPILL-THROUGH CIRCUIT

[75] Inventors: Charles E. Smith, Wauwatosa; Karl M. Hink, Hartland, both of Wis.; Donald J. Greening, deceased, late of Mequon, Wis., by Dorothy Greening, executrix, Mequon, Wis.

[73] Assignee: Cutler-Hammer, Inc., Milwaukee, Wis.

[22] Filed: June 27, 1973

[21] Appl. No.: 373,989

[52] U.S. Cl. .............. 318/271; 318/387; 318/430
[51] Int. Cl. ............................................ H02p 7/30
[58] Field of Search .......... 318/260, 271, 276, 332, 318/387, 390, 391, 392, 395, 396, 397, 398, 318/430, 431, 434

[56] References Cited
UNITED STATES PATENTS

| | | | |
|---|---|---|---|
| 3,383,578 | 5/1968 | Lewis | 318/332 |
| 3,465,227 | 9/1969 | Ivie | 318/260 |
| 3,536,975 | 10/1970 | Hough | 318/396 |
| 3,599,063 | 8/1971 | Nanai | 318/398 |
| 3,603,856 | 9/1971 | Zalar | 318/395 |
| 3,777,235 | 12/1973 | Lahti | 318/434 |

Primary Examiner—Robert K. Schaefer
Assistant Examiner—John J. Feldhaus
Attorney, Agent, or Firm—H. R. Rather; Wm. A. Autio

[57] ABSTRACT

A D.C. motor control system of the closed loop regulating type is disclosed. The system includes a timed speed reference circuit with means for clamping the same to hold the speed reference voltage change at a rate that corresponds to the rate of motor speed change when armature current limit action occurs during acceleration and deceleration periods of the motor. A speed error spill-through circuit is also provided to increase the proportional speed gain of the system when the speed error increases beyond a given percentage of base speed to afford improved damping characteristics and reduce overshoot or undershoot of the overall motor drive.

6 Claims, 4 Drawing Figures

Fig. 1a

MOTOR SPEED CONTROL SYSTEM WITH TIMED SPEED REFERENCE CLAMP AND SPEED ERROR SPILL-THROUGH CIRCUIT

BACKGROUND OF THE INVENTION

D.C. motor control systems commonly employ timed speed reference acceleration circuits to insure that the motor will change from one to another preset speed at a predetermined ramp or linear rate of change in speed. The rate of change of speed reference voltage afforded by such circuits normally is independent of actual changes in load on dthe motor during the acceleration of deceleration periods. Consequently if a step change in load is imposed on the motor causing actuation of armature current limit action, the motor speed will change at a much slower rate than that dictated by the rate change in the timed speed reference voltage. Accordingly, if the desired preset speed reference voltage is reached before deactivation of armature current limit action as a result of removal of the step change in load, the motor will then rapidly accelerate or decelerate to the preset speed at a rate allowed by current limit control conditions. This uncontrolled rate of change in motor speed can produce undue stresses in the motor and driven machines.

It is desirable to prevent such rapid rate of change in motor speed by requiring that the timed speed reference circuits be "clamped" or be forced to effect a rate of change in speed reference voltage corresponding to, or "track" with the rate of change in motor speed whenever the motor is operating in armature current limit mode. This will insure upon deactivation of the armature current limit circuits that the timed speed reference voltage will thereafter change at the preset rate, and that the change in motor speed will continue at the desired timed controlled rate.

D.C. motor speed regulating systems incorporating a speed error integrator adjusted to provide critical damping for a step change in load, can cause a speed overshoot of the motor as much as 13.5% of the base speed. In some applications it may be desirable to have a slow recovery response when the motor is subjected to a step change in load. However, the latter condition can result in undershoot and if the motor is running at a very slow speed it can occur before the motor attains its original speed. Such degrees of over and undershoot are undesirable and should be limited in most areas to 3 to 6% of base speed. To overcome this it is desirable to increase the gain of the proportional speed error control voltage whenever the speed error signal attains a predetermined value.

SUMMARY OF THE INVENTION

The present invention pertains to a D.C. motor control system of the closed loop type which controls the motor armature current in accordance with speed error and armature current. It more particularly relates to improvements in the timed reference speed control circuits of such a system, and to improvements in the damping response of such system.

In accordance with one aspect of the invention the timed reference speed control voltage is clamped, and made to change in the motor speed when armature current limit circuits are actuated during periods of motor acceleration. This action is accomplished by means of a current limit clamp circuit which responds to rise in voltage output of a current reference error detector circuit to a predetermined value. At this voltage level a zener diode in circuit between with the input terminal of the timed reference speed integrator amplifier and the current limit clamp circuits conducts and impresses a feed back input voltage. This effectively clamps the speed reference integrator amplifier so that its output voltage will increase only at a rate corresponding to the rate of change in speed of the motor under current limit action. When current limit action ceases, and the motor has not yet reached its preset speed, the speed reference integrator amplifier will then be unclamped and can proceed to increase its output voltage in accordance with its preset rate.

Another aspect of the invention provides for step change in speed error amplifier gain in accordance with a step change in load above a given magnitude to increase the control system response and thereby enhance the system damping action against motor speed over or undershoot. This is accomplished by use of a spill-through circuit connected in parallel with the main feed path between the output of a speed error detector amplifier and an input to a current error reference detector amplifier. This circuit contains transistor switches responsive to predetermined levels of voltage output of the speed error detector amplifier to activate a parallel gain increasing feed path to the input of the current error reference detector amplifier. When the spill-through circuit is activated the control system gain is increased to increase the overall motor system damping to reduce speed over and undershoot.

DESCRIPTION OF A PREFERRED EMBODIMENT

Figure 1A:
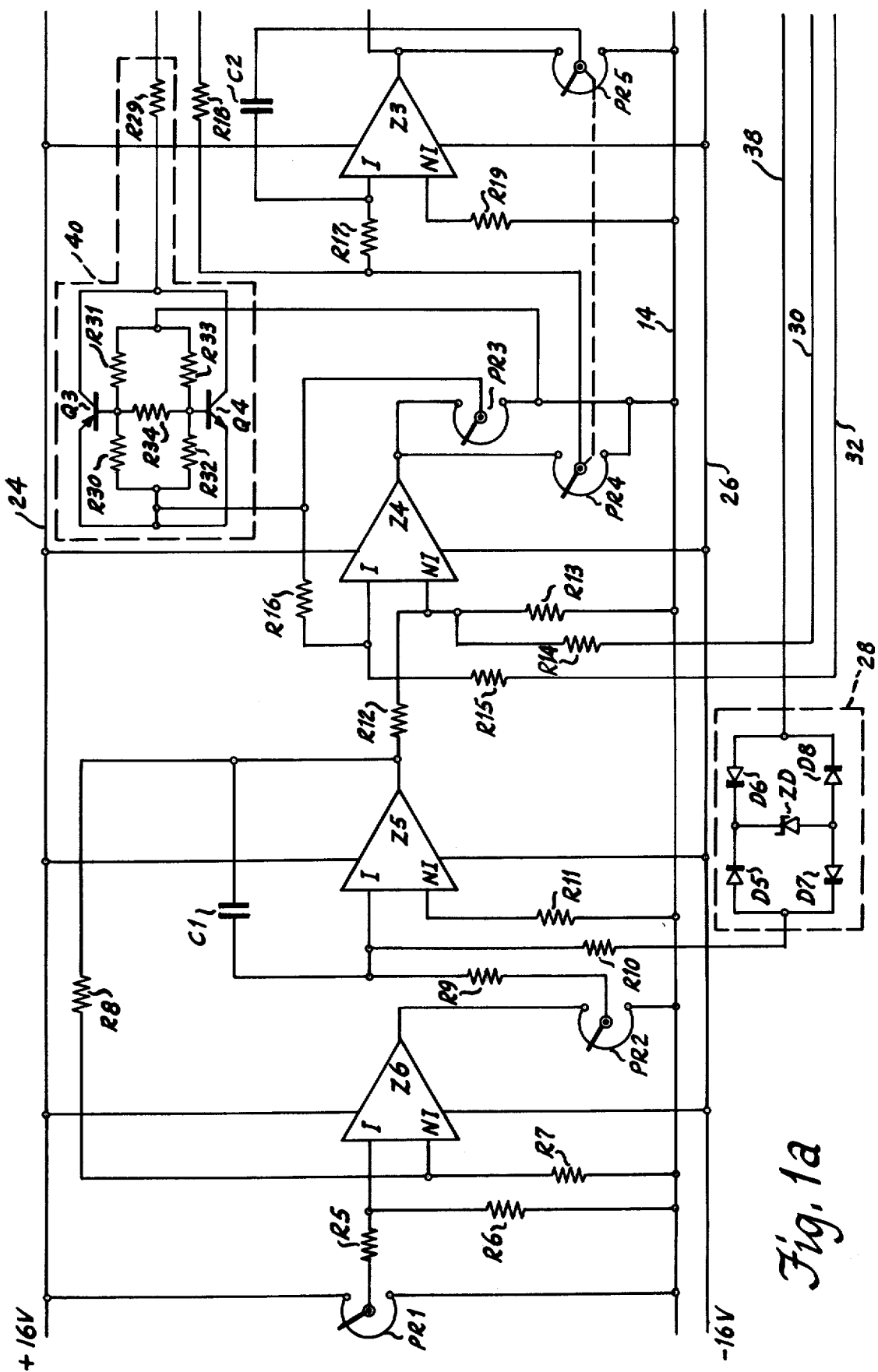
FIGS. 1a and 1b joined together are a diagramatic showing of a complete motor control system for a D.C. electric motor embodying the invention.
Figure 1B:
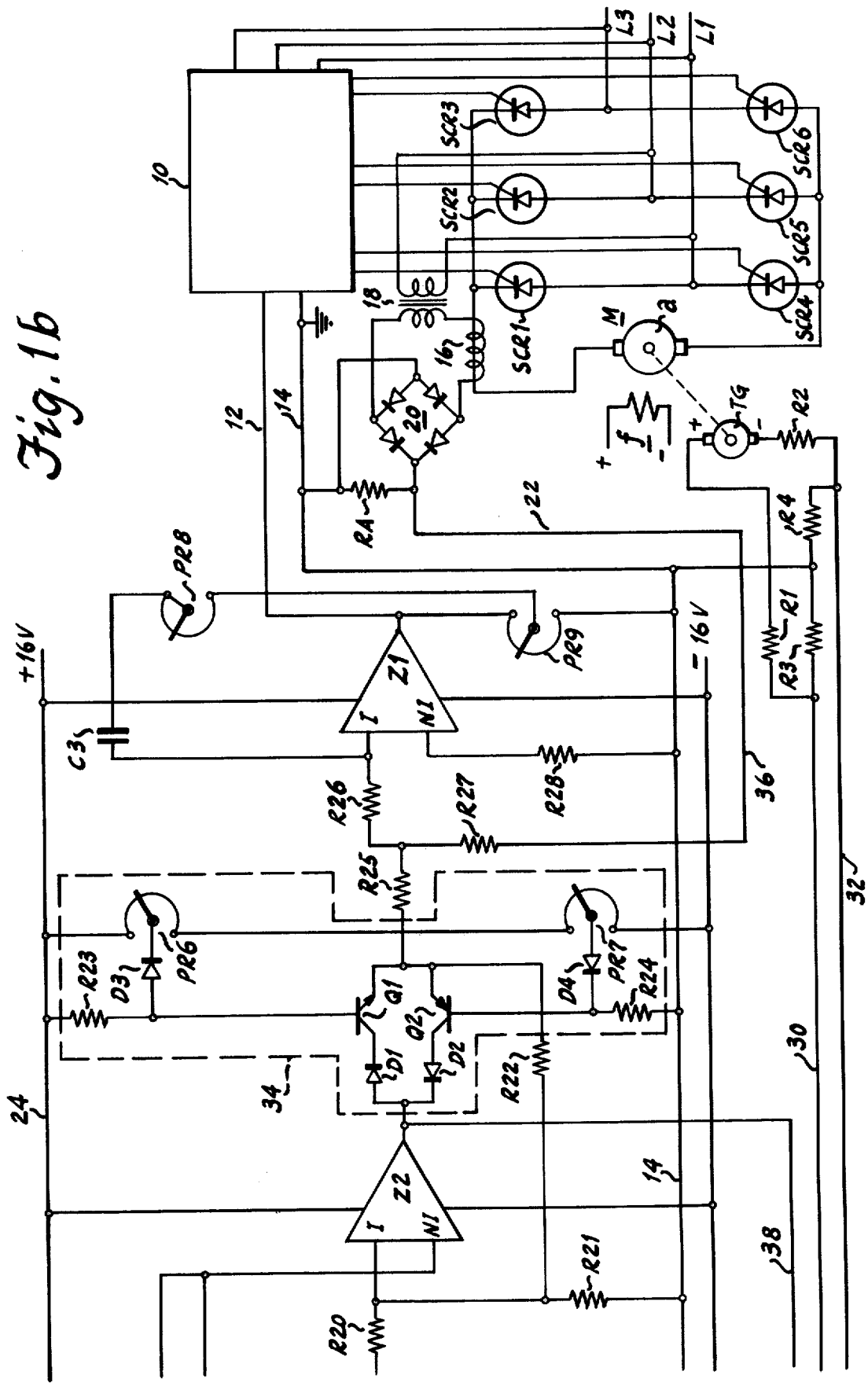

With the right hand end of FIG. 1a connected to the left hand end of FIG. 1b, a complete motor energizing and control system embodying the invention is depicted. Power for the motor and control circuits is provided by three phase A.C. supply lines L1, L2 and L3. The armature $a$ of a motor M is supplied at its upper terminal from lines L1, L2 and L3 by silicon controlled rectifiers SCR1, SCR2 and SCR3 respectively. Return paths for the motor armature current back to such supply lines are provided by silicon controlled rectifiers SCR4, SCR5 and SCR6 respectively. Motor M has a shunt field $f$ which may be assumed to be supplied with a constant D.C. potential.

The cathodes and gate electrodes of the silicon controlled, rectifiers SCR1 to SCR6 are connected to a firing control circuit schematically depicted at 10. Circuit 10 is connected to supply buses L1, L2 and L3 and may be assumed to advance and retard the phase of the conduction periods of the silicon control rectifiers in accordance with the magnitude and direction of a control signal input voltage of line 12, relative to a common, grounded bus 14.

A tachometer generator TG, driven by the shaft of motor M has its upper and lower output terminals connected through resistors R1 and R2 to the upper and lower ends of the series connected voltage divider resistors R3 and R4. The point common between resistors R3 and R4 is connected to common bus 14. Thus, if motor M is running in the forward (clockwise) direction the potential of the point common between resistors R1 and R3 will be positive with respect to bus 14, and the potential of the point common between resistors R2 and R4 will be negative with respect to bus 14. When motor M is running in the reverse (counterclockwise) direction, it will be apparent that the polarties of the potentials at such points will be reversed.

A current monitoring signal generator comprising a current measuring winding 16, transformer 18, a rectifier bridge 20, and a resistor RA provides a D.C. output signal to line 22, which is directly proportional to the motor armature current.

The regulating control system is provided with positive and negative constant D.C. potential buses 24 and 26 respectively. In a preferred embodiment the potential of line 24 relative to bus 14 is +16 volts and the potential of bus 26 relative to bus 14 is −16 volts.

The control system includes from right to left in FIG. 1a and 1b, six operational amplifiers Z1 to Z6. Each of these amplifiers have positive and negative bus terminals connected to the buses 24 and 26 respectively.

Amplifier Z6 has its inverting input terminal connected in series with a resistor R5 to the adjustable slider of a potentiometer rheostat PR1 and in series with a resistor R6 to bus 14. The resistance element of rheostate PR1 is connected across buses 14 and 24. The non-inverting terminal of amplifier Z6 is connected in series with a resistor R7 to bus 14, and is also connected in series with a resistor R8 to the output terminal of speed reference integrator amplifier Z5. The output terminal of amplifier Z6 is connected in series with the resistance element of a potentiometer theostat PR2 to bus 14.

The adjustable slider of rheostat PR2 is connected in series with a resistor R9 to the inverting input terminal of amplifier Z5. The inverting input terminal of Z5 is also connected in series with a capacitor C1 to the output terminal of Z5, and in series with a resistor R10 to the left terminal of a timed rate reference clamp bridge circuit which will hereinafter be more fully described. The non-inverting input terminal of Z5 is connected in series with a resistor R11 to bus 14.

As thus far described, amplifiers Z6 and Z5 in accordance with the adjustments of sliders of PR1 and PR2 provide a timed reference speed signal at the output terminal of Z5 which is determinative of the speed at which motor M will be regulated to maintain. The setting of PR1 of course determines the reference or desired speed, and the setting of PR2 determines the slope or rate at which the output signal of Z5 will increase or decrease with time after initial energization of buses 14, 24 and 26 or after a new setting of the slider of PR1 is effected. Amplifier Z6 by virtue of its non-inverting terminal connection to the common point between resistors R7 and R8 acts as an electronic switch cutting its output voltage down to a very small value when the output voltage of Z5 has reached the desired speed level. The combined capacitance of C1 and effective resistance of PR2 and R9 cause amplifier Z5 to act as an integrator of the output signal of Z6.

The output terminal of Z5 is connected in series with a resistor R12 to the non-inverting input terminal of the speed error detector amplifier Z4. The latter terminal is also connected in series with a resistor R13 to bus 14, and also in series with a resistor R14 and a speed feedback signal line 30 to the point common between resistors R1 and R3. The inverting input terminal of Z4 is connected in series with a resistor R5 and with speed feed back signal line 32 to the point common between resistors R2 and R4. The last mentioned input terminal of Z4 is also connected in series with a feed back resistor R16 to the adjustable slider of a potentiometer rheostat PR3 that has its resistive element connected between the output terminal of Z4 and bus 14.

It will be appreciated that amplifier Z4 acts as a speed error detector. If in forward operation of motor M, the output signal of Z5 is of a positive potential and the speed error feed back is of negative potential, the resultant input signal to the non-inverting input signal will be the algebraic resultant. The effective feed back resistance of resistor R16 and rheostat PR 3 determines the gain of amplifier Z4.

A second potentiometer rheostat PR4 has its resistance element connected between the output terminal of amplifier Z4 and bus 14. The adjustable slider of PR4 is connected in series with a resistor R17 to the inverting input terminal of speed error integrator amplifier Z3 and also in series with a resistor R18 to the non-inverting input terminal of current reference error detector amplifier Z2. The adjusting element of rheostat PR4 is mechanically coupled to the adjusting element of a potentiometer rheostat PR5, and is movable in tandem therewith.

The non-inverting input terminal of amplifier Z3 is connected to bus 14 in series with a resistor R19. A capacitor C2 is connected between the inverting input terminal of amplifier Z3 and the adjustable slider of rheostat PR5. Speed error integrator amplifier Z3 provides an output signal which changes at a rate dependent upon the magnitude of the output signal from speed error detector amplifier Z4, and the setting of the adjusting element of rheostat PR5.

The output terminal of amplifier Z3 is connected in series with a resistor R20 to the inverting input terminal of amplifier Z2. The last mentioned input terminal is also connected in series with a resistor R21 to bus 14. The output terminal of amplifier Z2 is connected in one parallel branch with a diode D1 and the collector-emitter circuit of an N-P-N transistor Q1 of a current limit clamp circuit contained within the broken line enclosure designated 34, and in another parallel branch in series with the reversely poled diode D2 and the collector-emitter circuit of a P-N-P transistor Q2. The point common between the emitters of Q1 and Q2 are connected in series with a feed back resistor R22 to the point common between resistors R20 and R21 and the inverting input terminal of amplifier Z2.

The base of transistor Q1 is connected in series with a resistor R23 to bus 24, and in series with a diode D3 to the adjustable slider of a potentiometer rheostat PR6. The base of transistor Q2 is similarly connected in series with a resistor R24 to bus 14 and in series with a reversely poled diode D4 to the adjustable slider of a potentiometer rheostat PR7. The resistance elements of rheostats PR6 and PR7 are connected in series across the buses 24 and 26.

The point common between the emitters of Q1 and Q2 is connected in series with resistors R25 nd R26 to the inverting input terminal of current integrator amplifier Z1. The point common between resistors R25 and R26 is also connected in series with a resistor R27 and a feed back line 36 to the output terminal of CMR. The non-inverting input terminal of amplifier Z1 is connected in series with a resistor R28 to bus 14. A capacitor C3 is connected at one end to the inverting input terminal of amplifier Z1, and at its other end in series with the resistance element of a current regulator lead adjusting rheostat PR8 to the adjustable slider of a current regulator gain rheostat PR9 which has its resistance element connected between the output terminal of Z1 and bus 14.

Current limit clamp action only occurs if the level of the output signal from amplifier Z2 rises to a given value. In normal operation of a preferred embodiment the level of output would be ± 10 volts. Such level is determined by adjustment of the sliders of rheostats PR6 and PR7 to provide a bias of +10 and −10 volts on the bases of transistors Q1 and Q2 respectively. As will be noted, trnsistors Q1 and Q2 are each connected in circuit in an emitter follower configuration so that the voltage level of their emitters will follow, and not appreciably exceed, the bias voltages on their associated base electrodes. Consequently, when current limit action occurs, the voltage applied to the inverting terminal of amplifier Z1 is effectively clamped at +10 volts in forward motor current operation and −10 volts in reverse motor current operation. The sliders of rheostats PR6 and PR7 can of course be adjusted to provide other levels of current limit clamp voltage between ±0.5 and ± 10 volts.

The output voltage of amplifier Z2 will follow the change in level of the voltage at its inverting input terminal so long as its output voltage is below the aforementioned current limit clamp voltage, e.g. ± 10 volts. When the current limit clamp voltage is reached there is no further increase in voltage across feed-back resistor R22, and if the signal voltage for the output of amplifier Z3 continues to rise, amplifier Z2 will saturate and its output voltage can then rise to a maximum of ± 15 volts.

The aforementioned timed rate reference clamp circuit 28 comprises diodes D5 to D8 connected in a full wave bride circuit, and a zener diode ZD connected across the vertical diagonal of the bridge circuit. A line 38 is connected from the output terminal of amplifier Z2 to the right hand terminal of the full wave bridge circuit while the left hand terminal as aforedescribed is connected inseries with resistor 10 to the inverting input terminal of amplifier Z5. When the output voltage of amplifier Z2 exceeds ± 10, zener diode ZD will conduct. Accordingly, a feed-back voltage which can vary between 0 to ± 5 volts will be applied to the inverting input terminal of amplifier Z5 which will oppose the change in output voltage applied to the latter terminal from the output of amplifier Z6 through the slider of rheostat PR2.

Figure 2:
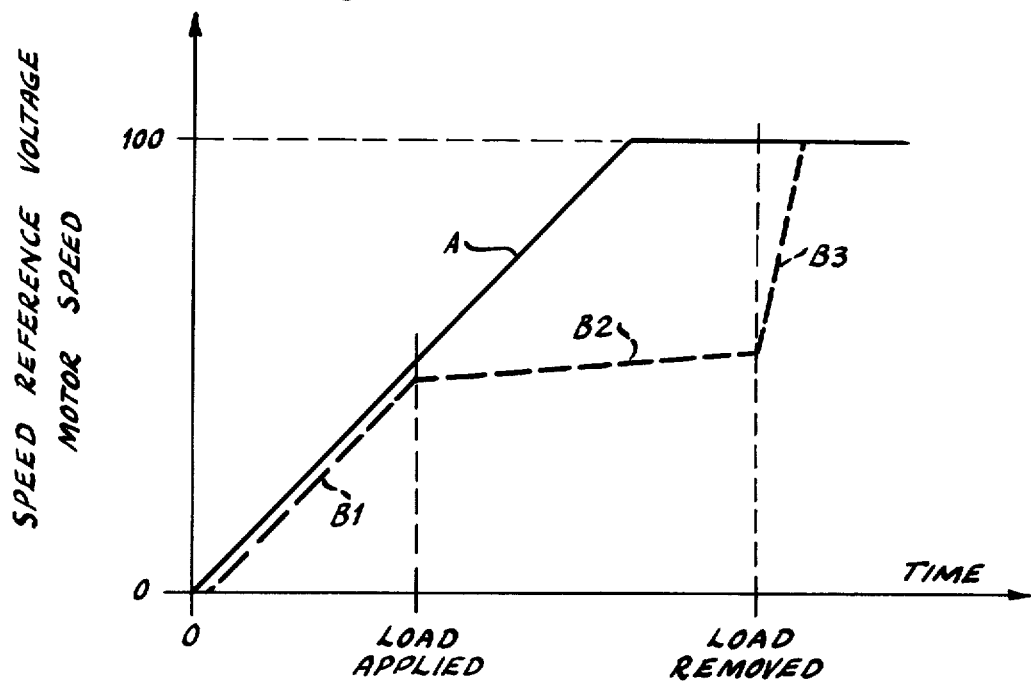
FIG. 2 is a graph showing certain characteristics of prior art motor control system.

Let it be assumed that with a give load on motor M and setting of the slider of rheostat PR1 that motor M accelerates from rest in the forward direction. For a given setting of the slider of rheostat PR2, the speed reference voltage output signal of amplifier Z5 would then increase in accordance with the full line curve A of FIG. 2, and the motor speed may be assumed to correspondingly increase in accordance with the portion B1 of the broken line curve B.

Now let it be assumed that a step increase in load on motor M is imposed while it is accelerating to the desired preset speed. Immediately the speed of the motor will decrease thereby reducing the feedback voltage to amplifier Z4, and as a consequence the output of the latter will increase. Consequently the output of amplifier Z3 and Z2 would correspondingly increase. If the output of Z2 exceeds ± 10 volts then current limit clamp action of circuit 34 occurs. Motor M when in current limit will then accelerate at a rate depicted by the portion B2 of curve B. Thereafter let it be assumed that the step increase in load is removed from motor M. Without the use of the timed rate reference clamp circuit 28 and its aforedescribed connections with the output terminal of amplifier Z2 and the inverting input terminal of amplifier Z5, the motor M would then rapidly accelerate at a rate in accordance with the portion B3 of curve B to the preset speed represented by the upper horizontal straight portion of curve A.

Figure 3:
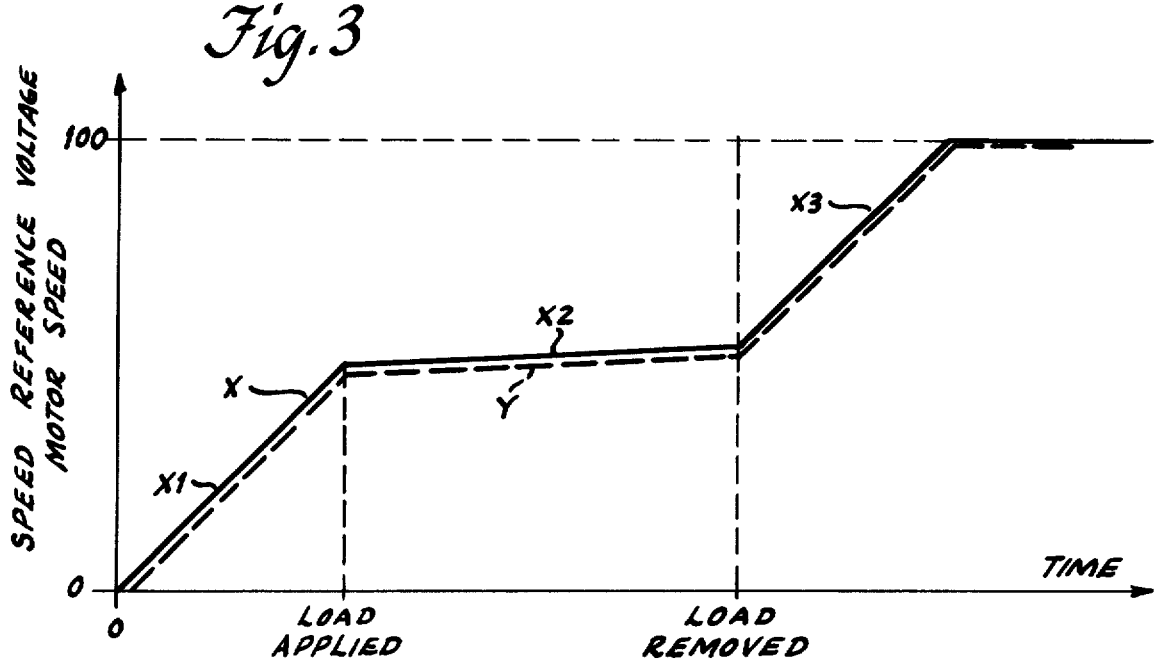
FIG. 3 is a graph showing similar characteristics of a motor control system embodying the invention.

It will be observed that if the output signal of speed reference integrator amplifier Z5 is permitted to uniformly increase to the value dictated by the desired preset speed, while the motor M is operating in current limit, that upon removal of the step change in load, that motor M will then accelerate as rapidly as current limit conditions allow. Now with the timed reference rate clamp circuit action, the rate of increase in the output of amplifier Z5 is made to track the rate of increase in motor speed when motor M is operating in current limit during acceleration. As shown in FIG. 3, the full line curve X depicts the change in the output voltage of speed reference amplifier Z5, and the broken line curve Y the corresponding change in speed of motor M.

When the step increase in load occurs during acceleration and motor M operates in current limit, the feed back signal output from amplifier Z2 through circuit 28 causes the rate of change in the level of output of amplifier Z5 to change from that depicted by portion X1 of curve X to that depicted by the portion X2. Then, if the motor M has not completed its acceleration to the desired preset speed by the time the sudden step increase in load is removed, it will thereafter increase at its original rate of increase as shown by the portion X3 of the full line curve. The curve Y depicting motor speed will then closely track the change in speed reference voltage The regulating control system of the present invention also includes a speed error spill-through circuit shown within broken line enclosure designated 40. This circuit comprises a P-N-P transistor Q3 and a N-P-N transistor Q4. The emitter of Q3 and collector of Q4 are connected to the slider of rheostat PR3, and the collector of Q3 and emitter of Q4 are connected in series with a resistor R29 to the non-inverting input terminal of amplifier Z2. The base of Q3 is connected to the point common between voltage dividing resistor R30 and R31 which are connected in series between the slider of rheostat PR3 and common bus 14. Similarly the base of Q4 is connected to the point common between voltage dividing resistors R32 and R33 which are connected in parallel with resistors R30 and R31. A resistor R34 is connected between the bases of Q3 and Q4.

Transistors Q3 and Q4 act as spill-through switches whenever the speed error output voltage of amplifier Z4 exceeds ± 1.2 volts or approximately 6% rated speed error. When Q3 of Q4 conducts resistor R29 is then effectively connected in parallel with resistor R18 between the output of amplifier Z4 and the non-inverting input terminal of amplifier Z2. Such step increase in voltage applied to the non-inverting input terminal of amplifier Z2 proportionally increases the speed gain in order to limit the speed overshoot or undershoot.

If the left hand ends of resistors R30 and R32 are disconnected from the slider of rheostat PR3, their transistors Q3 and Q4 will switch on whenever the effective portion of the output voltage of amplifier Z4 reaches ± 0.6 volts which corresponds to ± 3% speed error. Accordingly, amplifier Z2 will then proportionally increase the speed gain in order to limit the speed overshoot or undershoot a corresponding amount.

We claim:

1. In a D.C. motor control system, the combination with means for adjustably supplying energy to a motor armature, of control means for supplying the first mentioned means with a control voltage which is variable as a function of a speed reference voltage, a speed error feed back voltage and a current error feed back voltage, and comprising:
   a. speed reference means including means for presetting a desired magnitude of speed reference voltage and means holding change of such voltage to a predetermined timed rate following changes in adjustment of said presetting means,
   b. current limit clamp means responsive to an input signal, which is a function of said speed error feed back and said speed reference voltages, rising to or exceeding a preset value to clamp said control voltage to a value holding the motor armature current to a corresponding limited value, and
   c. timed reference rate of change clamp means in circuit with said current limit clamp means and with said means holding change of said speed reference voltage to predetermined timed rate following adjustment of said presetting means, and responsive to said control voltage being clamped to said value holding the armature current to a corresponding limited value to subject the last mentioned means to a voltage which causes the rate of change in the speed reference voltage to be clamped to a rate corresponding to the actual rate of change in motor speed if the latter voltage has not attained its preset magnitude.

2. The combination according to claim 1 wherein said timed reference rate clamp means includes a zener diode which is in circuit with the input of said means holding change of speed reference voltage to a predetermined timed rate and is subjected to the same resultant input voltage to which said current limit clamp means is subjected, and further including means causing said input voltage to exceed the breakdown voltage of said zener diode whenever said current limit clamp means clamps said control voltage as aforestated.

3. The combination according to claim 2 wherein said control means includes speed error detector means responsive to said speed error feed back voltage and said speed reference voltage and spill-through circuit means which is responsive to rise of the output voltage of said speed error detector means above a predetermined value to provide a step increase in the control system gain to thereby increase the damping action on the motor drive.

4. In a D.C. motor control system, the combination with means for adjustably supplying energy to a motor armature, of control means for supplying the first mentioned means with a control voltage which is variable as a function of a speed reference voltage, a speed error feed back voltage and a voltage which varies with armature current, and comprising
   a. speed reference meeans including means for presetting a desired magnitude of speed reference voltage and means holding change of such voltage to a predetermined rate following changes in adjustment of said presetting means,
   b. speed error detector and integrator means providing an output voltage varying in accordance with the output voltage of said speed reference means and said speed error feed back voltage,
   c. current reference error detector means responsive to the last mentioned output voltage to provide an output voltage varying in accordance therewith,
   d. current integrator means in circuit with the first mentioned means and normally responsive to the resulted between the output voltage of said current reference error detector means and said voltage which varies with motor armature current to control the output of said first mentioned means in accordance therewith,
   e. current limit clamp means in circuit between the input to said current integrator means and the output of said current reference error detector means and being responsive to the output voltage of the latter means rising to or exceeding a preset value to clamp the input voltage from the latter means to said current integrator means to a value holding the motor armature current to a corresponding limited value, and
   f. timed reference rate clamp means in circuit with said current reference error detector means, said current limit clamp means, and said means holding change of said speed reference to a predetermined timed rate and responsive to said current limit clamp means clamping said input voltage to said current integrator means to subject the last mentioned to a voltage which causes the rate of change in speed reference voltage to be clamped to a rate which corresponds to the rate of change in motor speed if such reference voltage has not attained its preset magnitude.

5. The combination according to claim 4 wherein said control means further includes a spill-through circuit connected between the output of said speed error detector means and an input to said current reference error detector means, said spill-through circuit being responsive to rise in output voltage of said speed error detector means above a predetermined value to provide a step increase in system gain.

6. The combination according to claim 4 wherein said current limit clamp means comprises a transistor connected in an emitter follower configuration and having a preset base voltage, wherein a feed back resistor is connected between the current limit clamp means and the input to said current reference error detector means, and wherein a zener diode is connected across one diagonal of a full wave rectifier bridge which has its other diagonal connected at one side to the input of said means affording change in said speed reference voltage at a predetermined rate and its other side connected to the output of said current reference error detector means.

* * * * *